United States Patent
Shaw et al.

(10) Patent No.: US 11,756,075 B2
(45) Date of Patent: *Sep. 12, 2023

(54) SYSTEMS, METHODS, AND MEDIA FOR DETECTING SUSPICIOUS ACTIVITY

(71) Applicant: Integral Ad Science, Inc., New York, NY (US)

(72) Inventors: Jason Lloyd Shaw, New York, NY (US); David William Luttrell, Philadelphia, PA (US); Arun Ahuja, Stamford, CT (US)

(73) Assignee: Integral Ad Science, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/716,838

(22) Filed: Apr. 8, 2022

(65) Prior Publication Data
US 2022/0374938 A1 Nov. 24, 2022

Related U.S. Application Data

(63) Continuation of application No. 16/544,322, filed on Aug. 19, 2019, now Pat. No. 11,301,894, which is a
(Continued)

(51) Int. Cl.
*G06Q 30/00* (2023.01)
*G06Q 30/0241* (2023.01)

(52) U.S. Cl.
CPC .............. *G06Q 30/0248* (2013.01)

(58) Field of Classification Search
CPC ................................ G06Q 30/0248
See application file for complete search history.

(56) References Cited

U.S. PATENT DOCUMENTS

| 7,657,626 B1 | 2/2010 | Zwicky |
| 8,655,724 B2 | 2/2014 | Chow et al. |

(Continued)

FOREIGN PATENT DOCUMENTS

WO  WO 2014124417  8/2014

OTHER PUBLICATIONS

AdSafe media announces the release of suspicious activity ratings. (Jul. 17, 2012). Internet Wire (Year: 2012).*

(Continued)

*Primary Examiner* — Matthew L Hamilton
(74) *Attorney, Agent, or Firm* — Byrne Poh LLP

(57) ABSTRACT

Systems, methods, and media for detecting suspicious activity in connection with advertisement impressions are provided. In some embodiments, the method includes: collecting advertisement impression information associated with a plurality of pages; determining, from the collected advertisement impression information, an indication of whether a browser application detected that an advertisement displayed on a webpage was viewable in a browser window; determining, from the collected advertisement impression information, a plurality of viewability statistics for each of the plurality of pages, wherein each viewability statistic indicates a likelihood of whether an advertisement displayed on a webpage was viewable in a browser window; comparing the plurality of viewability statistics with the indication from the browser application; determining a viewability score for the advertisement impression based on the comparison; and identifying the advertisement impression as likely to be suspicious based on the determined viewability score.

17 Claims, 7 Drawing Sheets

Related U.S. Application Data continuation of application No. 13/909,018, filed on Jun. 3, 2013, now Pat. No. 10,387,911.

(60) Provisional application No. 61/654,511, filed on Jun. 1, 2012.

(56) References Cited

U.S. PATENT DOCUMENTS

| | | |
|---|---|---|
| 8,671,057 B1 | 3/2014 | Zuili |
| 8,732,017 B2 | 5/2014 | Attenberg et al. |
| 9,298,845 B2 | 3/2016 | Belenguer |
| 10,552,878 B2 | 2/2020 | Lorimor et al. |
| 10,783,548 B1 | 9/2020 | Bhowmick et al. |
| 10,929,893 B2 | 2/2021 | Theodore |
| 11,068,931 B1 | 7/2021 | Luttrell et al. |
| 2001/0039523 A1 | 11/2001 | Iwamoto |
| 2007/0005417 A1 | 1/2007 | Desikan et al. |
| 2009/0012853 A1 | 1/2009 | Nolet et al. |
| 2009/0012867 A1 | 1/2009 | Lerman et al. |
| 2009/0043593 A1 | 2/2009 | Herbrich et al. |
| 2009/0254433 A1 | 10/2009 | Cao |
| 2010/0121676 A1 | 5/2010 | Jackson |
| 2011/0029393 A1 | 2/2011 | Apprendi et al. |
| 2011/0047006 A1 | 2/2011 | Attenberg et al. |
| 2011/0082755 A1 | 4/2011 | Itzhak |
| 2011/0137733 A1 | 6/2011 | Baird et al. |
| 2011/0137737 A1 | 6/2011 | Baird et al. |
| 2011/0173037 A1 | 7/2011 | Attenberg et al. |
| 2011/0196735 A1 | 8/2011 | von Sydow et al. |
| 2011/0251901 A1 | 10/2011 | Kwon et al. |
| 2011/0296009 A1 | 12/2011 | Baranov et al. |
| 2012/0047203 A1 | 2/2012 | Brown et al. |
| 2012/0324098 A1 | 12/2012 | De Jager et al. |
| 2013/0126844 A1 | 5/2013 | Nishiyama |
| 2013/0185164 A1 | 7/2013 | Pottjegort |
| 2013/0305170 A1 | 11/2013 | De Souza et al. |
| 2014/0173086 A1 | 6/2014 | Carncross et al. |
| 2014/0281901 A1 | 9/2014 | Mostowy et al. |
| 2016/0125453 A1 | 5/2016 | Shukla et al. |
| 2016/0180374 A1 | 6/2016 | Cetintas et al. |
| 2017/0228762 A1 | 8/2017 | Riviello et al. |
| 2017/0316467 A1 | 11/2017 | Seiler et al. |
| 2017/0357998 A1 | 12/2017 | Scharf |
| 2017/0372380 A1 | 12/2017 | Candiotti |
| 2018/0218389 A1 | 8/2018 | Walker et al. |

OTHER PUBLICATIONS

ADWeek Online, "DoubleVerify Aims to Police Web Ads", Jul. 22, 2010, available at: https://dialog.proquest.com/professional/docview/738256735?accountid=131444, pp. 1-5.

Li, Ai-Chun et al., "Application of Web Mining Technology to Click Fraud Detection", InComputer Engineering and Design, 33.3, Mar. 2012, pp. 957-962.

Notice of Allowance dated Dec. 10, 2021 in U.S. Appl. No. 16/544,322, pp. 2-8.

Notice of Allowanced dated Apr. 3, 2019 in U.S. Appl. No. 13/909,018, pp. 2-48.

Office Action dated Jan. 23, 2018 in U.S. Appl. No. 13/909,018, pp. 2-16.

Office Action dated Apr. 30, 2021 in U.S. Appl. No. 16/544,322, pp. 2-14.

Office Action dated May 19, 2017 in U.S. Appl. No. 13/909,018, pp. 1-34.

Office Action dated Aug. 31, 2018 in U.S. Appl. No. 13/909,018, pp. 2-85.

Office Action dated Sep. 9, 2016 in U.S. Appl. No. 13/909,018, pp. 2-41.

Office Action dated Oct. 28, 2015 in U.S. Appl. No. 13/909,018, pp. 1-50.

Office Action dated Dec. 17, 2020 in U.S. Appl. No. 16/544,322, pp. 2-12.

Press Release, "Mpire Adds Proactive Ad Block & RealTime Alert Capabilities to AdXpose Suite Ad Analytics Solutions; AudienceScience Leverages AdXpos to Protect Clients' Brands: Mpire Partners w/ comScore Enhance AdXpose's Demographic Campaign Perform.", PR Newswire, Feb. 3, 2010, pp. 1-3.

Sullivan, L. "Study: Half of Ad Impressions, 95 Percent of Clicks Fraudulent", Sep. 17, 2009, available at: http://www.mediapost.com/publications/article/113734/study-half-of-ad-impressions-95-perecent-of-click.html?edition=, pp. 1-4.

* cited by examiner

300

┌─────────────────────────────────────────────┐
│ IN RESPONSE TO DETERMINING THAT A DOMAIN    │ 310
│ SHOULD BE DEEMED SUSPICIOUS, EXTRACT THE    │
│ RECEIVED DATA ASSOCIATED WITH THE DOMAIN    │
│ (E.G., VIEWABILITY INFORMATION, OWNERSHIP   │
│ INFORMATION, REGISTRATION INFORMATION, SERVER│
│ INFORMATION, IP ADDRESS INFORMATION, ETC.)  │
└─────────────────────────────────────────────┘
                      ↓
┌─────────────────────────────────────────────┐
│ DETERMINE OTHER DOMAINS OR OTHER PAGES      │ 320
│ HAVING SIMILAR DATA TO THE EXTRACTED DATA   │
│ (E.G., SIMILAR OWNERSHIP INFORMATION, SIMILAR│
│ PERSONNEL, SIMILAR ADDRESS INFORMATION, ETC.)│
└─────────────────────────────────────────────┘
                      ↓
┌─────────────────────────────────────────────┐
│ DETERMINE WHETHER A DOMAIN SHOULD ALSO BE   │ 330
│ DEEMED SUSPICIOUS BASED ON SIMILARITY TO THE│
│ EXTRACTED DATA OF THE SUSPICIOUS DOMAIN     │
└─────────────────────────────────────────────┘

FIG. 3

SYSTEMS, METHODS, AND MEDIA FOR DETECTING SUSPICIOUS ACTIVITY

CROSS-REFERENCE TO RELATED APPLICATIONS

This application is a continuation of U.S. patent application Ser. No. 16/544,322, filed Aug. 19, 2019 which is a continuation of U.S. patent application Ser. No. 13/909,018, filed Jun. 3, 2013, which claims the benefit of U.S. Provisional Patent Application No. 61/654,511, filed Jun. 1, 2012, each of which is hereby incorporated by reference herein in its entirety.

TECHNICAL FIELD

The disclosed subject matter relates to systems, methods, and media for detecting suspicious activity in connection with advertisement impressions.

BACKGROUND

Media content, such as advertisements, is created with the goal of having the content viewed, listened to, or otherwise received by a target audience. The target audience may be, for example, one or more users with a set of particular interests or one or more of users falling in a particular demographic or psychographic group. However, distributing such media content to the desired audience is a difficult process. It is often difficult for brand managers, ad networks, publishers, advertisers, and/or advertising agencies (collectively referred to herein as "advertisers") to control and manage the service of their advertisements.

There is therefore a need in the art for approaches for controlling and managing the distribution of advertisements for publication on webpages and websites. These advertisers are concerned with fraud, where advertisements that have little to no potential of being viewed by a human user are served. More particularly, advertisers are concerned with webpages and/or websites that are engaging in monetizing fraud activities, such as click fraud, advertisement impression fraud, or other deceptive behavior. Click fraud generally relates to the imitation of a legitimate user of a web browser application clicking on or selecting an advertisement such that a payment for the selection is made without having an actual interest in the advertisement and/or with the objective of depleting advertising budgets. Impression fraud generally relates to falsely generating advertisement impressions that affect the advertiser (e.g., repetitive keyword searches without clicking a viewable advertisement, multiple advertisements are displayed in layers over each other where one advertisement is seen, but multiple impressions are reported, etc.). Yet another example of monetizing fraud includes false attribution, where credit for a conversion is given for a false advertisement impression or an advertisement that is never viewed.

Approaches for perpetrating these types of fraud can include the use of 1) botnet traffic, where non-human bots are used to view and click on advertisements, 2) iframe stuffing, where a webpage along with its advertisements are stuffed into a 1×1 pixel that is served on another website, and/or 3) ad stacking, where multiple advertisements are placed on top of one another in a single advertisement placement and where only the top advertisement is viewable by a user.

Accordingly, it is desirable to provide methods, systems, and media that overcome these and other deficiencies of the prior art.

SUMMARY

In accordance with some embodiments of the disclosed subject matter, systems, methods, and media for detecting suspicious activity in connection with advertisement impressions are provided.

In accordance with some embodiments of the disclosed subject matter, a method for detecting suspicious activity from a plurality of websites, the method comprising: collecting, using a hardware processor, advertisement impression information associated with a plurality of pages; determining, from the collected advertisement impression information, an indication of whether a browser application detected that an advertisement displayed on a webpage was viewable in a browser window; determining, from the collected advertisement impression information, a plurality of viewability statistics for each of the plurality of pages, wherein each viewability statistic indicates a likelihood of whether an advertisement displayed on a webpage was viewable in a browser window; comparing the plurality of viewability statistics with the indication from the browser application; determining a viewability score for the advertisement impression based on the comparison; and identifying the advertisement impression as likely to be suspicious based on the determined viewability score.

In some embodiments, the method includes transmitting information relating to the identified website to an advertiser that inhibits the advertiser from associating with a corresponding website.

In some embodiments, the plurality of viewability statistics includes a never-in-view statistic that comprises a fraction of advertisement impressions that was never in a viewable region of the browser window.

In some embodiments, identifying the at least one website as likely to be suspicious based on the viewability score further comprises determining that the never-in-view statistic exceeds a selected threshold value, wherein the selected threshold value indicates that the website is engaging in suspicious activity.

In some embodiments, determining the plurality of viewability statistics further comprises: generating a distribution of spoofing rates associated with the collected viewability information; dividing the distribution of spoofing rates into a first sub-distribution of normal websites and a second sub-distribution of suspicious websites; and determining the viewability score for each spoofing rate in the distribution of spoofing rates based on relative strength between the first sub-distribution and the second sub-distribution.

In some embodiments, wherein aggregating the plurality of viewability statistics comprises: determining a portion of the plurality of pages corresponding to the website; determining one or more advertisements presented on the portion of the plurality of pages; and determining a plurality of browsers associated with advertisement calls for the one or more advertisements.

In some embodiments, the method further comprises: extracting identification data associated with the at least one website that is deemed suspicious; searching for other websites having identification data that is similar to the extracted identification data; and determining whether at least one of the other websites should be deemed as likely to be suspicious.

In some embodiments, the method further comprises: receiving training data; identifying features for differentiating suspicious websites from normal websites using the received training data; and using a classifier with the identified features to identify the suspicious websites from the plurality of websites.

In accordance with some embodiments of the disclosed subject matter, a system for detecting suspicious activity from a plurality of websites is provided, the system comprising a hardware processor that: collects, using a hardware processor, advertisement impression information associated with a plurality of pages; determines, from the collected advertisement impression information, an indication of whether a browser application detected that an advertisement displayed on a webpage was viewable in a browser window; determines, from the collected advertisement impression information, a plurality of viewability statistics for each of the plurality of pages, wherein each viewability statistic indicates a likelihood of whether an advertisement displayed on a webpage was viewable in a browser window; compares the plurality of viewability statistics with the indication from the browser application; determining a viewability score for the advertisement impression based on the comparison; and identifying the advertisement impression as likely to be suspicious based on the determined viewability score.

In accordance with some embodiments of the disclosed subject matter, a non-transitory computer-readable medium containing computer-executable instructions is provided that, when executed by a processor, cause the process to perform a method for detecting suspicious activity from a plurality of websites. The method comprises: collecting advertisement impression information associated with a plurality of pages; determining, from the collected advertisement impression information, an indication of whether a browser application detected that an advertisement displayed on a webpage was viewable in a browser window; determining, from the collected advertisement impression information, a plurality of viewability statistics for each of the plurality of pages, wherein each viewability statistic indicates a likelihood of whether an advertisement displayed on a webpage was viewable in a browser window; comparing the plurality of viewability statistics with the indication from the browser application; determining a viewability score for the advertisement impression based on the comparison; and identifying the advertisement impression as likely to be suspicious based on the determined viewability score.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 3 is a diagram of an illustrative process for detecting multiple domains engaging in suspicious activity, such as a ring of sites that display a collection of links drawn from a common inventory, in accordance with some embodiments of the disclosed subject matter.

DETAILED DESCRIPTION

In accordance with various embodiments, mechanisms for detecting suspicious activity in connection with advertisement impressions are provided.

These mechanisms can be used in a variety of applications. For example, these mechanisms can be used to detect whether a website or an IP address is engaging in click fraud, impression fraud, or other deceptive behavior. Click fraud generally relates to the imitation of a legitimate user of a web browser application clicking on or selecting an advertisement such that a payment for the selection is made without having an actual interest in the advertisement and/or with the objective of depleting advertising budgets. Impression fraud generally relates to falsely generating advertisement impressions that affect the advertiser (e.g., repetitive keyword searches without clicking a viewable advertisement, multiple advertisements are displayed in layers over each other where one advertisement is seen, but multiple impressions are reported, etc.). In another example, in pre-bid scenarios, these mechanisms can inhibit inventory associated with suspicious websites or IP addresses deemed as likely to be engaging in fraud or other deceptive behavior from being purchased by bidders in a real-time bidding exchange. In yet another example, these mechanisms can inhibit advertisement impressions associated with suspicious websites from being counted.

In some embodiments, these mechanisms can detect suspicious activity from websites or IP addresses based on one or more determined statistics. For example, advertisement impression data can be received from one or more sources (e.g., collected advertisement calls, an external data source, etc.). In a more particular example, advertisement impression data can be analyzed and, in some embodiments, can be broken down by individual advertisement places that include advertiser information, advertisement network information, advertisement exchange information, and/or other suitable identifiers. As such, the mechanisms can detect that an individual impression on a site is suspicious in comparison with other advertisement impressions. The mechanisms can analyze the advertisement impression data to determine one or more statistics, such as browser proportion (e.g., the proportion of traffic coming from each type of browser application, such as Mozilla Firefox, Microsoft Internet Explorer, Google Chrome, etc.), spoofing rate (e.g., browser spoofing to mimic particular browser applications), viewability sampling rate, never-in-view rate, PageRank, botnet-like activity, viewability method disagreement or mismatch, etc. In response to determining one or more of these statistics, the mechanisms can then determine whether to classify an advertisement impression as suspicious.

Figure 1:
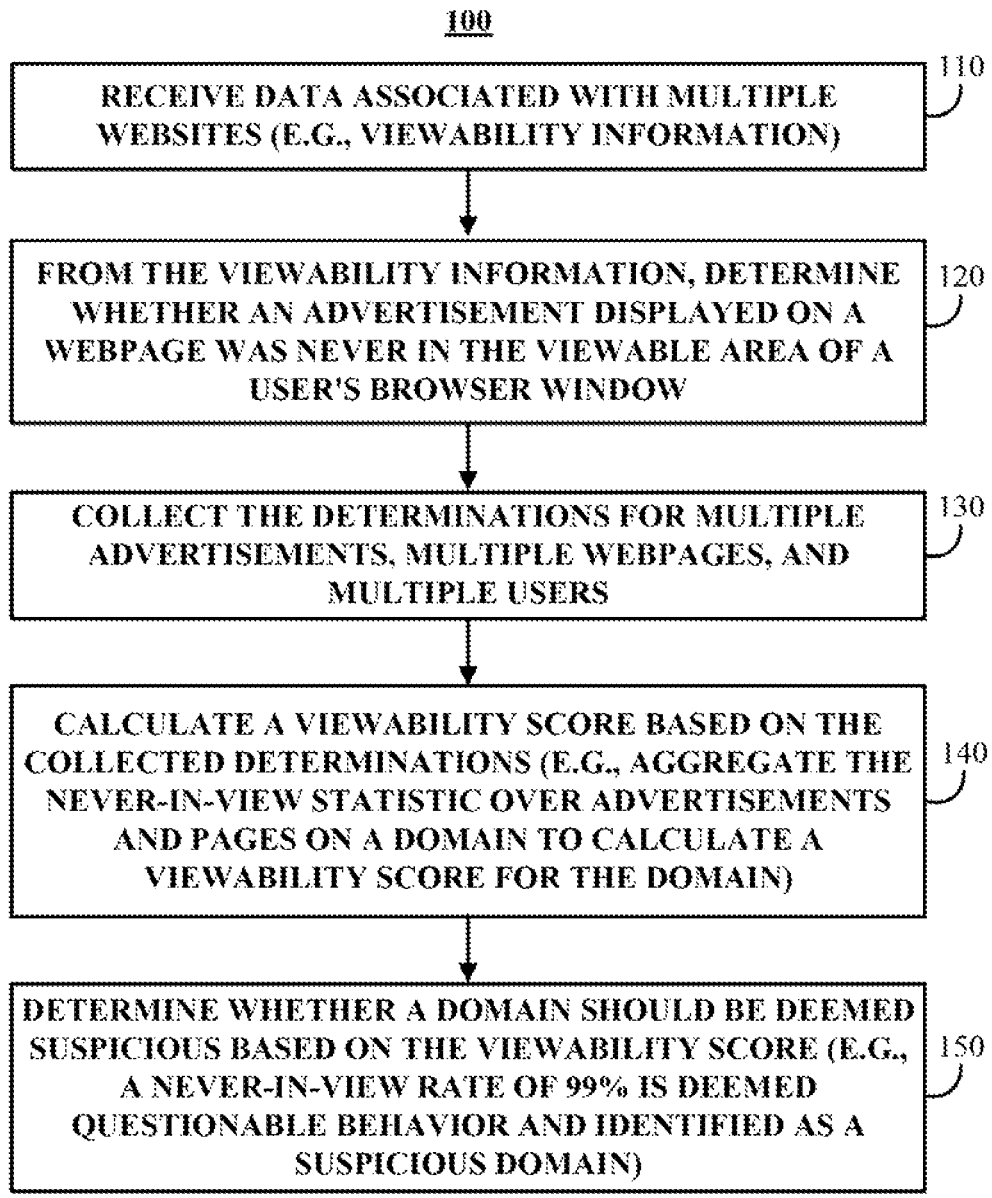
FIG. 1 is a diagram of an illustrative process for calculating a viewability score and determining whether a domain should be deemed suspicious based on the viewability score in accordance with some embodiments of the disclosed subject matter.

In a more particular example, these mechanisms can calculate a viewability score based on viewability information and/or other associated data to determine whether a domain or an IP address should be deemed suspicious. Turning to FIG. 1, an illustrative flow diagram 100 for calculating a viewability score and determining whether a domain or IP address associated with an advertisement impression should be deemed suspicious based on the viewability score is shown in accordance with some embodiments of the disclosed subject matter. As shown, the suspicious activity mechanisms begin by receiving data associated with multiple websites at 110. The received data can include, for example, advertisement impression data and viewability information and can be received from one or more sources (e.g., various domains, various products that collect viewability information, etc.).

If the obtained data includes viewability information, it should be noted that approaches for determining advertisement viewability and user engagement metrics are further described in commonly-owned, commonly-assigned U.S. patent application Ser. No. 13/740,353, filed Sep. 13, 2012, which is hereby incorporated by reference herein in its entirety.

The mechanisms can determine, from the viewability information or other received data, one or more statistical measurements at 120. In one particular example, the mechanisms can calculate the fraction of advertisement impressions from the received viewability information where the advertisement displayed on a website was never in the viewable area of a user's browser window. This viewability statistic is sometimes referred to herein as a statistic corresponding to an advertisement that is "never-in-view" or a "never-in-view rate."

In some embodiments, the viewability statistic can be aggregated over multiple advertisements, multiple webpages, and/or multiple users at 130. For example, a never-in-view statistic can be aggregated over all advertisements and all pages on a domain. In another example, a never-in-view statistic can be aggregated over all advertisements served to browser windows on pages of a domain to generate a domain-level never-in-view statistic. At 140, a viewability score can be calculated based on the aggregated never-in-view statistic. For example, the percentage of never-in-view advertisements on pages of a domain is calculated and converted into a viewability sore based on rules or experience that never-in-view rates greater than a particular threshold value are unreasonable and frequently signal questionable behavior or suspicious activity by a website. In a more particular example, a particular viewability score can be calculated based on a rule that never-in-view rates of about 99% or more are unreasonable and signal suspicious activity by a website. Based on the viewability score, the mechanisms can determine whether a domain should be deemed as a suspicious domain or a domain engaging in suspicious activity at 150. Alternatively, the mechanisms can flag a potentially suspicious domain based on the viewability score and continue to monitor the viewability information and/or viewability scores associated with the domain.

Figure 2:
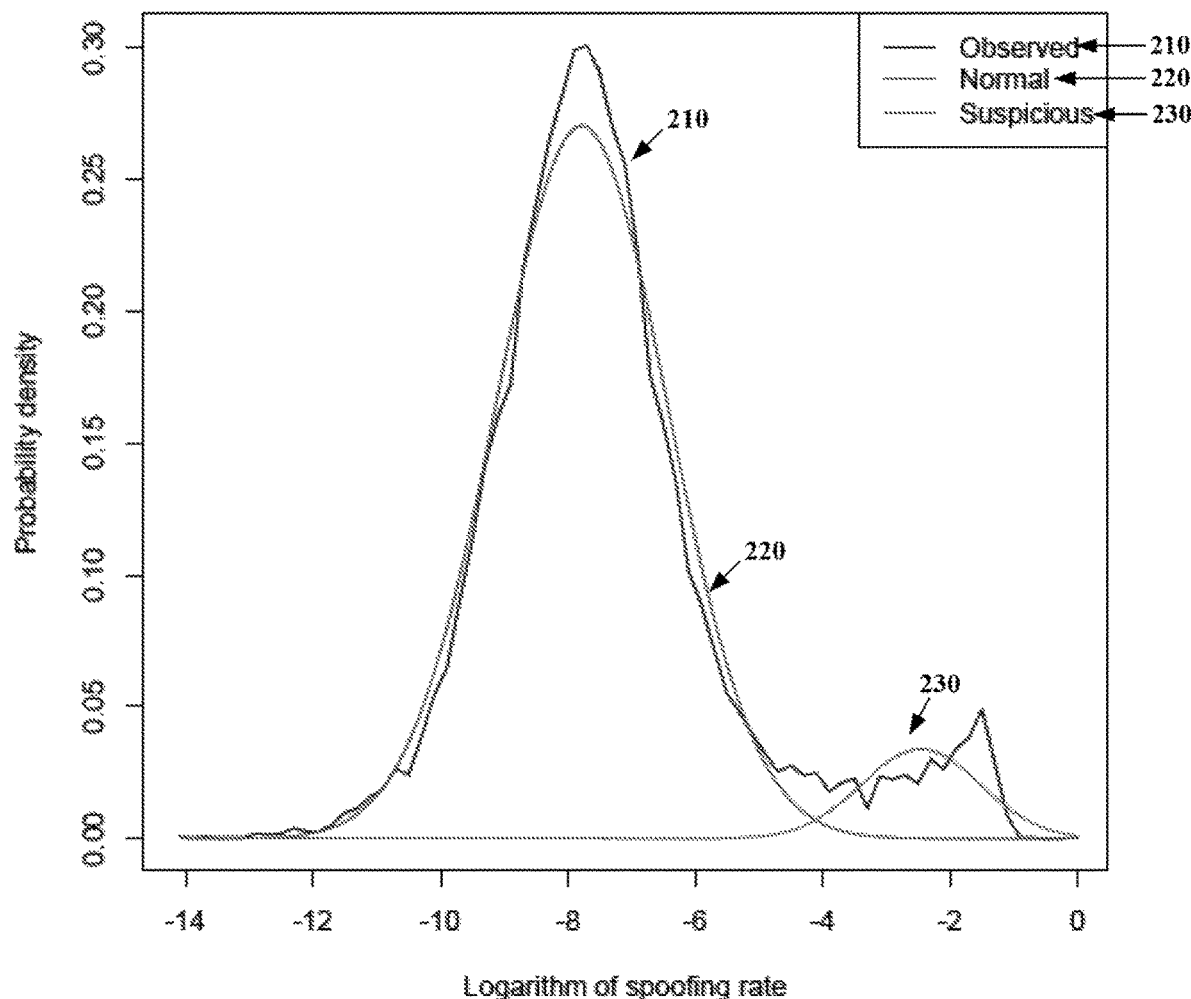
FIG. 2 is a diagram of an overall observed distribution of spoofing rates, which can be approximated by a linear combination of two sub-distributions to determine normal websites and suspicious websites, in accordance with some embodiments of the disclosed subject matter.

Alternatively or additionally, in some embodiments, the mechanisms can determine whether an advertisement impression should be deemed suspicious based on the extent or rate of browser spoofing to mimic particular browser applications (e.g., Chrome browser applications). Rather than setting and comparing against a particular threshold value (e.g., a never-in-view rate of 99%), the mechanisms can generate a distribution of spoofing rates. As shown, for example, in the distributions of FIG. 2, the mechanisms can generate an overall observed distribution of spoofing rates 210, which can be approximated by a linear combination of two sub-distributions. Using a mixture modeling approach, the overall observed distribution can be defined as a mixture of two sub-distributions—a first sub-distribution 220 (which is deemed normal) and a second sub-distribution 230 (which is deemed suspicious). That is, two sub-distributions can be fitted to the two distributions that approximately sum to the overall distribution 210. The viewability score or any other suitable statistic can then be based on the relative strengths of the sub-distribution at that rate. Upon obtaining a score for a particular spoofing rate, the mechanisms can determine whether an advertisement impression should be deemed suspicious.

In some embodiments, additional signals can be used to determine whether a website, domain, or an individual IP address in connection with an advertisement impression is likely engaging in suspicious activity. For example, the mechanisms can use page crawls as inputs to catalog the links between webpages. In a more particular example, such page crawl information can be obtained from brand safety rating applications described, for example, in commonly-owned, commonly-assigned U.S. patent application Ser. No. 13/151,146, filed Jun. 1, 2011, and U.S. patent application Ser. No. 12/859,763, filed Aug. 19, 2010, which are hereby incorporated by reference herein in their entireties. The mechanisms can input these page crawls into a PageRank algorithm or any other suitable link analysis algorithm to determine the relatively popularity and/or reputation of the websites and/or webpages. For example, the PageRank algorithm can assign a numerical weight to a particular webpage or website that indicates its relative importance within a set of documents. In a more particular example, the PageRank algorithm can indicate that, if www.nytimes.com links to a particular website, the particular website is a good or reputable website that other browsers are likely to visit. Websites with a higher PageRank rating tend to be highly trafficked as such websites are worth visiting if they are worth linking to. Alternatively, for websites that should be deemed suspicious, the PageRank rating is generally low (e.g., websites that few visit intentionally with the purpose of consuming the content).

In response to obtaining a PageRank rating for a particular website and monitoring traffic volume signals associated with that website, the mechanisms can identify illegitimate traffic from suspicious domains that is driving particular advertisement impressions in response to determining a mismatch between the obtained PageRank rating (e.g., a low PageRank rating) and monitored traffic volume (e.g., a high traffic volume).

In some embodiments, the mechanisms can be used to detect whether iframe stuffing or any other suitable impression fraud is being performed by a website. As described above, this type of fraud generally includes placing an entire webpage along with all of its advertisements into a 1×1 iframe onto another website. In response, browsers that visit the other website load the entire webpage along with all of its advertisements in the 1×1 iframe without realizing it. As described above in connection with FIG. 1, the mechanisms can obtain viewability information. One approach for determining whether an advertisement has been viewed is to place FLASH-based monitoring code within a website and, more particularly, adjacent to the advertisement, in order to monitor advertisement viewability, using the frame rate or other optimizations within FLASH that change depending on whether the FLASH object is on- or off-screen as a proxy for determining viewability. In a more particular example, the monitoring code can detect that the media player application, such as a FLASH player, has throttled or decreased the frame rate when the monitoring code adjacent to the advertisement is out of view (e.g., throttled down to two frames per second). In another more particular example, the monitoring code can detect that the media player application is not rendering such a 1×1 iframe.

FLASH-based monitoring code and other approaches for determining advertisement viewability are further described, for example, in above-mentioned U.S. patent application Ser. No. 13/740,353, filed Sep. 13, 2012.

In some embodiments, the mechanisms can obtain viewability information relating to an advertisement impression from FLASH-based monitoring code. In response, the mechanisms can compare the viewability information with other viewability information to determine whether a disagreement or mismatch is present. More particularly, the mechanisms can compare the viewability information obtained from the FLASH-based monitoring code and the viewability information obtained from Javascript-based approaches. In the example of iframe stuffing, the mechanisms can determine that the Javascript-based approach indicates the advertisement impression was in view and the FLASH-based monitoring code indicates the advertisement impression was out of view. The mechanism can flag or identify this advertisement impression as being placed behind something (e.g., another advertisement) that is in view. In response to this disagreement, the mechanisms can indicate that the particular advertisement impression is likely to be fraudulent.

Additionally or alternatively, the mechanisms can determine whether an advertisement has been viewed by placing GIF-based monitoring code within a web site and, more particular, adjacent to the advertisement. For example, in some embodiments, these mechanisms can be used to provide an animated image file, such as a GIF image, that is associated with content or a portion of content, such as an advertisement on a webpage. The animated image file can include a sequence of colors, where each color is displayed at a given time interval. By monitoring one or more animated image files for a given webpage, the mechanisms can be used to determine whether the content (or portion of content) was in view or is in view, and the amount of time that the content was in view. It should be noted that, when the animated image file is displayed in a browser window, the animated image file is animated (e.g., the sequence of colors is played back). On the other hand, when the animated image file is not displayed in the browser window (e.g., because the browser scrolled away, because the animated image file is not in view, etc.), the animated image file ceases to animate in some currently available browsers.

Features for detecting content viewability using an animated image file are further described, for example, in commonly-owned, commonly-assigned U.S. patent application Ser. No. 13/836,700, filed Mar. 15, 2013, which is hereby incorporated by reference herein in its entirety.

Similarly to the use of FLASH-based monitoring code described above, the mechanisms can compare the viewability information from the GIF-based monitoring code with other viewability information (e.g., from Javascript-based approaches) to determine whether a disagreement or mismatch is present. In the example of iframe stuffing, the mechanisms can determine that the Javascript-based approach indicates the advertisement impression was in view and the GIF-based monitoring code indicates the advertisement impression was out of view (e.g., the animation is not detected). The mechanism can flag or identify this advertisement impression as being placed behind something (e.g., another advertisement) that is in view. In response to this disagreement, the mechanisms can indicate that the particular advertisement impression is likely to be fraudulent.

In some embodiments, the mechanisms can identify whether an advertisement impression is fraudulent based on the proportion of traffic coming from particular browser applications, such as Mozilla Firefox, Google Chrome, Microsoft Internet Explorer, etc. For example, the mechanisms can generate a score that reflects the amount of traffic originating from particular browser applications. In response to determining that suspicious traffic tends to originate from a particular browser application, the mechanisms can weight one or more rules based on the browser proportion (e.g., thresholds for suspicious activity are lowered when analyzing advertisement impression from a browser application that tends to include suspicious traffic). In another example, the mechanisms can generate a score that reflects the number of high-volume visitors from particular browser applications, such that sites with a higher proportion of visits from a few browsers can be scored more highly. It can also be determined which browser application such high-volume visitors are using.

It should be noted that, although the embodiments described herein generally relate to determining or detecting whether a website or domain is engaging in suspicious activity (e.g., click fraud, impression fraud, etc.), this is merely illustrative. In some embodiments, the mechanisms can be used to detect whether an individual webpage from multiple webpages is engaging in suspicious activity. For example, the mechanisms can generate a viewability score for a particular webpage. In response to detecting that an individual webpage is involved in suspicious or questionable activity, the mechanisms can designate the individual webpage as suspicious and other webpages associated with or linked from the individual webpage. Alternatively, the mechanisms can designate the individual webpage as suspicious and monitor webpages and/or websites associated with the individual webpage to determine whether those webpages and/or websites should also be designated as engaging in suspicious activity.

In some embodiments, these mechanisms can be used to detect multiple domains engaging in suspicious activity. For example, these mechanisms can be used to identify a ring of sites, such as a ring of sites that display a collection of links drawn from a common inventory. As shown in FIG. 3, the suspicious activity detection mechanisms can extract data associated with a suspicious domain or a suspicious website at 310. The extracted data can include, for example, viewability information, ownership information, registration information, server information, IP address information, link information, etc. In response to extracting the data, the mechanisms can determine other domains or other pages having data similar to the extracted data (e.g., same server information, same ownership information, etc.) at 320. In a more particular example, the mechanisms can use the extracted information to exploit other incriminating associations, such as the connections between the suspicious websites and the personnel affiliated with them (e.g., identifying an executive of a suspicious website and determining other websites associated with that executive). In another more particular example, the mechanisms can use the extracted information to determine whether other websites or webpages linked from the suspicious website should also be deemed suspicious at 330. This can include, for example, calculating a viewability score for the websites or webpages linked from the suspicious website. Alternatively, the mechanisms can compile a list of flagged websites based on the extracted information for further monitoring and/or calculating viewability scores.

In some embodiments, the mechanisms can identify a ring of sites or a ring of suspicious activity using IP address information. Mappings between domain names and IP address are generally not one-to-one, where domain name system (DNS) services translate domain names into IP address in order to route Internet traffic. As such, multiple domain names can resolve or translate to a single IP address and this may be the case for suspicious sites. More particularly, a ring of sites, such as a ring of sites that display a collection of links drawn from a common inventory, may be multiple domain names that resolve to a single IP address. The mechanisms can determine the IP address to a single server and identify each of the URLs served by the single server as engaging in suspicious activity.

Additionally or alternatively, these mechanisms can identify a ring of sites or a ring of suspicious activity based on the browsers that visit a suspicious website or a website that is likely to be engaging in fraudulent activity. For example, a browser that visits a suspicious website may be observed to visit other suspicious websites as well. More particularly, the mechanisms can, based on advertisement calls or other identifying information, monitor IP addresses, media access control (MAC) addresses, unique device identifiers (UDID), etc., determine which browsers are accessing websites that have been flagged as likely to be engaging in fraudulent activity. In response to determining a set of browsers, the mechanisms can determine one or more websites having an overlap among their audience and use these websites to identify a ring of sites or a ring of suspicious activity.

Figure 4:
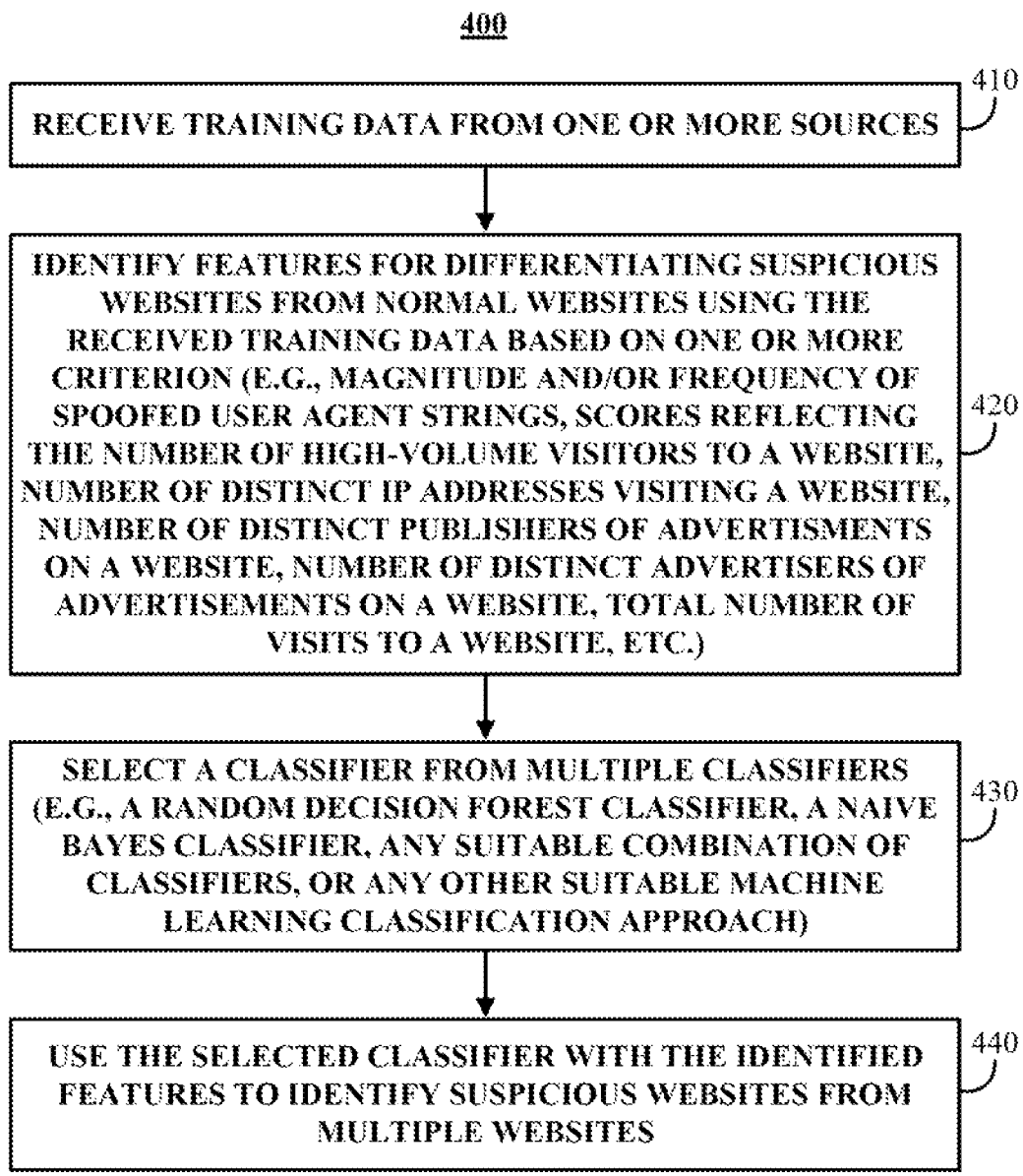
FIG. 4 is a diagram of an illustrative process for identifying suspicious websites using a machine learning approach in accordance with some embodiments of the disclosed subject matter.

In some embodiments, these mechanisms can be used to identify suspicious websites using a machine learning approach. As shown in FIG. 4, the mechanisms can begin by receiving training data from one or more sources for training a classification model at 410. The training data can include, for example, a list of websites having high click-through rates and, as such, were removed from inventory.

Additionally or alternatively, the mechanisms can receive websites and/or webpages that have been identified as suspicious or flagged for monitoring based on viewability scores, never-in-view rates, spoofing rates, and/or any other suitable metric. These websites and/or webpages can be used by the mechanisms as training data.

Using the training data, the mechanisms can identify features for differentiating suspicious websites from normal websites at 420. Such features can include, for example:
  the magnitude and/or frequency of spoofed user agent strings during visits to the website by comparing the HTTP header to information derived from an approach that detects browser information;
  the magnitude and/or frequency of user agents being spoofed to mimic particular browsers (e.g., users using a Chrome web browser application);
  the score that reflects the number of high-volume visitors to a websites (e.g., a website with a high proportion of visits from a few visitors can be scored more highly);
  the magnitude and/or frequency of impressions that successfully collected viewability information;
  the number of distinct IP address visiting the website (e.g., total count and per site visit);
  the number of distinct publishers of advertisements on the website (e.g., total count and per site visit);
  the number of distinct advertisers of advertisements on the website (e.g., total count and per site visit); and
  the total number of visits to the website.

Upon identifying one or more of the above-mentioned features, the mechanisms can select a machine learning approach from multiple machine learning approaches (e.g., logistic regression, support vector machines, Bayesian approaches, decision trees, etc.) at 430. In some embodiments, the mechanisms can select a machine learning approach from multiple machine learning approaches based on the size and/or type of data in the training data. Alternatively, the mechanisms can select a machine learning approach from multiple machine learning approaches based on the identified features.

Other machine learning approaches, such as direct and hybrid data acquisition approaches, are further described, for example, in commonly-owned, commonly-assigned U.S. patent application Ser. No. 12/986,108, filed Jan. 6, 2011, which is hereby incorporated by reference herein in its entirety.

At 440, the mechanisms can use the selected machine learning approach to identify suspicious websites from normal websites.

Figure 5:
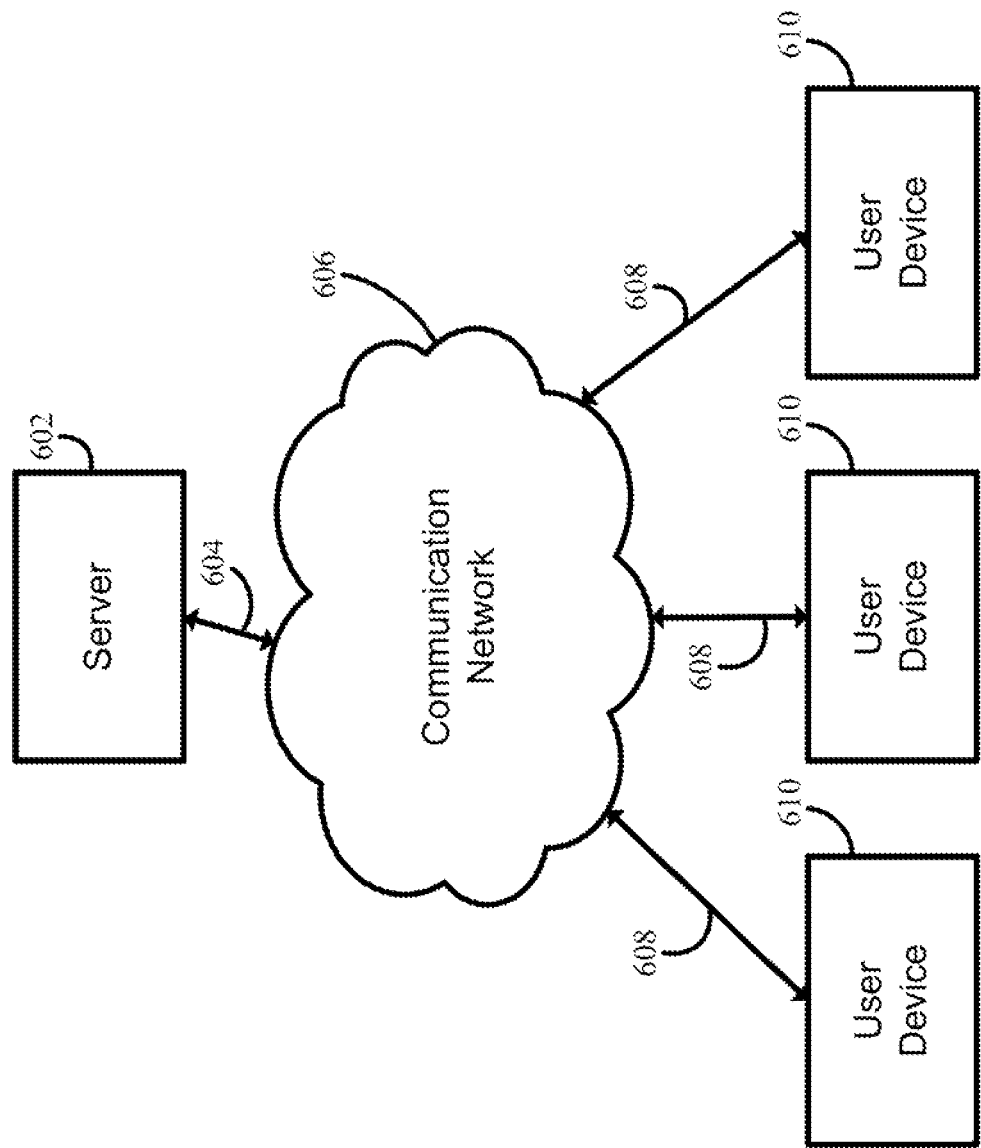
FIG. 5 is a diagram of an illustrative system on which mechanisms for detecting suspicious activity in connection with advertisement impressions can be implemented in accordance with some embodiments of the disclosed subject matter.

FIG. 5 shows an example of a generalized schematic diagram of a system 600 on which the mechanisms for detecting suspicious activity from websites described herein can be implemented as an application in accordance with some embodiments. As illustrated, system 600 can include one or more user devices 610. User devices 610 can be local to each other or remote from each other. User devices 610 can be connected by one or more communications links 608 to a communications network 606 that can be linked via a communications link 606 to a server 602.

System 600 can include one or more servers 602. Server 602 can be any suitable server for providing access to the application, such as a processor, a computer, a data processing device, or any suitable combination of such devices. For example, the application can be distributed into multiple backend components and multiple frontend components or interfaces. In a more particular example, backend components, such as data collection and data distribution can be performed on one or more servers 602.

More particularly, for example, each of the user devices 610 and server 602 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 610 can be implemented as a personal computer, a smartphone, a tablet computer, a personal data assistant (PDA), a multimedia terminal, a mobile telephone, a set-top box, a television, a game console, etc.

Referring back to FIG. 5, communications network 606 can be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any suitable combination of any of such networks. Communications links 604 and 608 can be any communications links suitable for communicating data between user devices 610 and server 602, such as network links, dial-up links, wireless links, hard-wired links, any other suitable communications links, or any suitable combination of such links. User devices 610 can enable a user to load a web page that causes features of the application to be accessed. User devices 610 and server 602 can be located at any suitable location.

Figure 6:
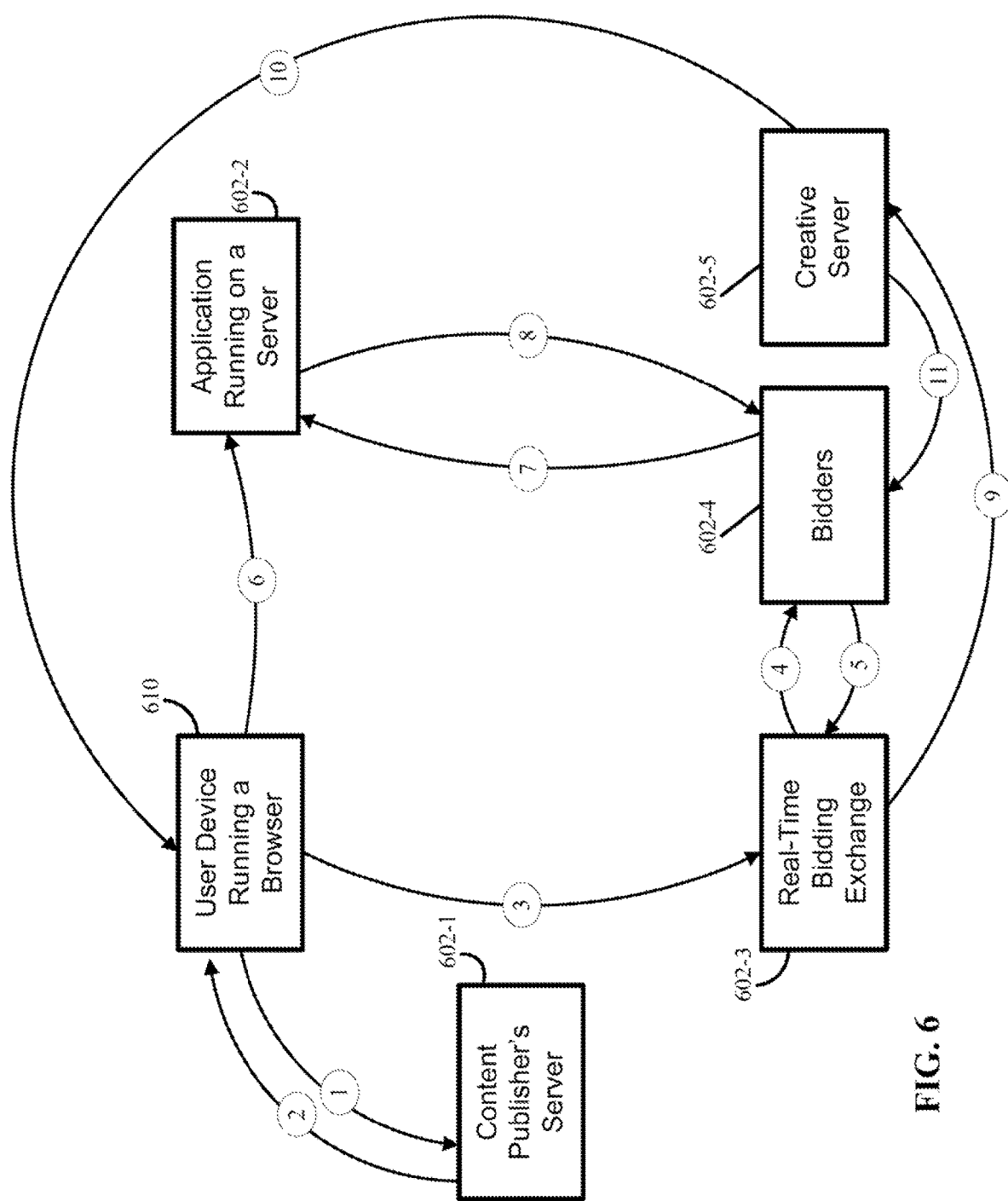
FIG. 6 is a diagram of an illustrative process flow for placing an advertisement in response to an advertisement call in accordance with some embodiments of the disclosed subject matter.

FIG. 6 illustrates an example of a process flow for placing an advertisement in response to an advertisement call in accordance with various embodiments. Turning to FIG. 6, in some embodiments, a browser running on a user device 610 can send a request (at transaction 1) for content, such as a web page, from a content publisher's server 602-1. For example, a user using a browser application can input a URL or an IP address corresponding to a domain of a content publisher or a specific page within the domain of a content publisher. As another example, the user using the browser application can be automatically directed to content publisher's server 602-1 by selecting a hyperlink or in response to a redirect from another URL or IP address, or any other suitable approach in which a browser running on a user device can be directed to request content from content publisher's server 602-1.

In response to receiving a request for content from the browser application running on user deice 610, content publisher's server 602-1 can deliver (at transaction 2) browser code containing instructions that cause the browser running on user device 610 to render the content, for example, a web page. The browser code can include, for example, an advertisement call instructing the browser to request an advertisement from an advertisement server, instructions to request an advertisement call from an advertisement server, an image or video advertisement containing text, etc. Additionally or alternatively, the browser code can include an advertisement call or instruction to request an advertising call that instructs the browser to request that a real-time bidding exchange sell an advertisement placement associated with the advertisement call on the real-time bidding exchange.

The browser running on user device 610 can execute the advertisement call and send a request (at transaction 3) for an advertisement to be placed on the web page rendered by the browser in an advertisement placement associated with the advertisement call. In some embodiments, the request for an advertisement can be transmitted to a real-time bidding exchange 602-3 or any other suitable advertisement exchange.

In some embodiments, the advertisement call can be intercepted by or redirected to the application running on a server 602-2, where server 602-2 can add metrics and/or other information along with the advertisement call to real-time bidding exchange 602-3. Additionally or alternatively, some portion or all of the browser code and/or an analysis of the browser can be sent with request (3) in accordance with the illustrative methods (e.g., process 300) described above.

Figure 7:
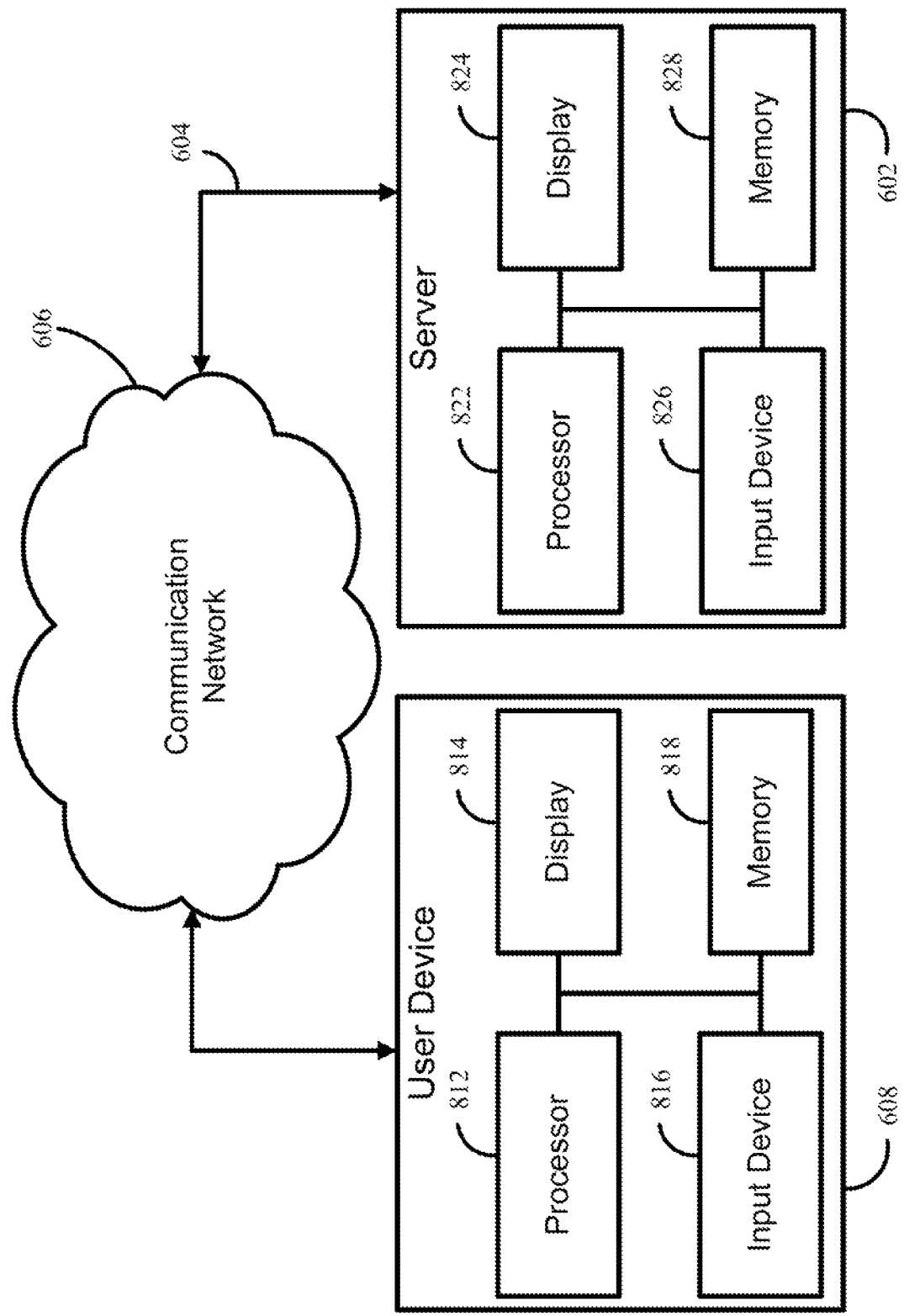
FIG. 7 is a diagram of an illustrative user device and server as provided, for example, in FIG. 5 in accordance with some embodiments of the disclosed subject matter.

The real-time bidding exchange running on server 602-3 can provide one or more bidders, such as demand side platform bidders, with an opportunity to place a bid on the advertisement placement (at transaction 4). For example, as shown in FIG. 7, a bidder using server 602-4 can, during an auction for an advertisement placement, place a bid (at transaction 5) to the real-time bidding exchange 602-3 stating how much the bidder is willing to pay to place an advertisement in an advertisement space associated with the advertisement call. It should be noted that the real-time bidding exchange running on server 602-3 can run on multiple servers in various different locations, and that one server is shown for the sake of simplicity. It should also be noted that bidders 602-4 are also represented using a single server, but this is merely illustrative. Bidders 602-4 can be located on multiple servers or other devices capable of placing bids with the real-time bidding exchange 602-3. Bidders can also be represented by various other organizations and/or people, such as marketers, demand side platforms, etc., that can place bids or cause bids to be placed on behalf of the various bidders.

In some embodiments, monitoring code included in the advertisement and/or advertisement call (or installed as part of the browser or otherwise installed on user device 610) can deliver (at transaction 6) user engagement data to the application. For example, the monitoring code can include advertisement placement information, browser information, advertisement viewability information, and/or user engagement information on one or more pages. The data associated with user device 610 can be transmitted to application 602-2 at any suitable time (e.g., when the browser application is executed, when the browser application is closed or terminated, at particular intervals of time, etc.). This data can, for example, be used to generate user engagement metrics and/or probabilistic models in accordance with various embodiments as described herein.

In some embodiments, the bidder 602-4 can transmit the requested URL or other suitable information to the application 602-2 in response to receiving an opportunity or request to place a bid on an advertisement placement (at transaction 7). For example, in response to receiving an opportunity to bid on the placement of an advertisement on a particular browser for a particular page (e.g., www.pageurl.com), the bidder 602-4 can transmit the page information (e.g., www-.pageurl.com) to the application 602-2. In response to receiving the information from bidder 602-4, the application 602-2, using data derived from the advertisement placement, advertisement viewability, and/or user engagement information transmitted from user device 610 (at transaction 6), can provide a data feed, such as a real-time data feed, to bidder 602-4 that includes advertisement viewability metrics, user engagement metrics, probabilistic model information, viewability scores, viewability statistics, and/or any other suitable information for assisting in the bidding decision of bidder 602-4 (at transaction 8). In addition, in some embodiments, the application can also provide rating information to bidder 602-4. Features relating to the use of classification models for calculating content quality ratings for web pages, domains, and sitelets are further described, for example, in commonly-owned, commonly-assigned U.S. patent application Ser. No. 12/859,763, filed Aug. 19, 2010 and U.S. patent application Ser. No. 13/151,146, filed Jun. 1, 2011, which are hereby incorporated by reference herein in their entireties.

In response, bidder 602-4 can place an informed bid (or not) on the advertisement placement with real-time bidding exchange 602-3 (at transaction 5).

The real-time bidding exchange 602-3 can select a bidder to award the advertisement placement to (referred to herein as the "winning" bidder), where the selected bidder is sometimes the bidder willing to pay the highest price for an advertisement placement. In some instances, other considerations may be used in determining which bidder to award an advertisement placement. After a particular bidder has been awarded the advertisement placement, the real-time bidding exchange 602-3 can send instructions (at transaction 9) to the publisher, creative server, or any other suitable advertisement server 602-5 for delivering the advertisement associated with the winning bidder to user device 610, where the advertisement is then delivered (at transaction 10). Advertisement server 602-5 can confirm and/or verify to the winning bidder that the advertisement has been served on the particular page for user device 610 (at transaction 11). Alternatively, the real-time bidding exchange 602-3 can send instructions to another suitable entity for instructing the creative server 602-5, such as the browser running on the user device 610, bidders 602-4, etc. In this example, the browser at user device 610 can then request the specific advertisement from the creative server 602-5, and the creative server 602-5 can deliver the advertisement to the browser at user device 610.

It should be noted that the process flow described above can be altered in various ways, including removing or adding participants, such as supply side platforms, publisher's ad servers, demand side platforms, etc., or removing participants, such as the real-time bidding exchange, the creative server (e.g., the advertisement can be delivered directly from a bidder), etc. Further, user engagement metrics and/or probabilistic models can be delivered to advertisement sellers, such as content publishers, and can be used in selling direct advertising, or in applications other than use with real-time bidding exchanges.

FIG. 7 illustrates an example of hardware 600 where the server and one of the user devices depicted in FIG. 5 are illustrated in more detail. Referring to FIG. 7, user device 610 can include a processor 812, a display 814, an input device 816, and memory 818, which can be interconnected. In some embodiments, memory 818 can include a storage device (such as a computer-readable medium) for storing a computer program for controlling processor 812.

Processor 812 can use the computer program to present on display 814 a browser window that loads a web page with an advertisement and/or other data received through communications link 608 and commands and values transmitted by a user of user device 610. It should also be noted that data received through communications link 608 or any other communications links can be received from any suitable source. Input device 816 can be a computer keyboard, a cursor-controller, dial, switchbank, lever, touchscreen, or any other suitable input device as would be used by a designer of input systems or process control systems.

Server 602 can include processor 822, display 824, input device 826, and memory 828, which can be interconnected. In some embodiments, memory 828 can include a storage device for storing data received through communications link 604 or through other links, and also receives commands and values transmitted by one or more users. The storage device can further include a server program for controlling processor 822.

In one particular embodiment, the application can include client-side software, hardware, or both. For example, the application can encompass a computer program written in a programming language recognizable by the computing device (e.g., user device, server, etc.) executing the application (e.g., via any suitable encoding, such as Java, C, Objective-C, C++, C#, Javascript, Adobe Flash, ActionScript, Visual Basic, HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Accordingly, methods, systems, and media for detecting suspicious activity from websites are provided.

Any suitable hardware and/or software can be used to perform the mechanisms described herein. For example, a general purpose device such as a computer or a special purpose device such as a client, a server, etc. can be used to execute software for performing the mechanisms described herein. Any of these general or special purpose devices can include any suitable components such as a hardware processor (which can be a microprocessor, digital signal processor, a controller, etc.), memory, communication interfaces, display controllers, input devices, etc. This hardware and/or software can be implemented as part of other equipment or can be implemented as stand-alone equipment (which can be coupled to other equipment).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for detecting suspicious activity from a plurality of websites, the method comprising:
   receiving, using a server that includes a hardware processor, advertisement impression information associated with a plurality of pages;
   determining, by the server, from the received advertisement impression information, a never-in-view statistic for each of the plurality of pages, wherein the never-in-view statistic indicates a likelihood of whether an advertisement displayed on a webpage was never within a viewable area in a browser window rendered by a browser application;
   determining, by the server, a viewability score for the advertisement impression based on the never-in-view statistic;
   identifying, by the server, the advertisement impression as likely to be suspicious based on the determined viewability score; and
   transmitting, by the server, information relating to the advertisement identified as likely to be suspicious from being purchased for advertisement placement.

2. The method of claim 1, further comprising inhibiting content associated with the advertisement impression identified as likely to be suspicious from being purchased for advertisement placement.

3. The method of claim 1, further comprising transmitting information relating to the identified advertisement impression that inhibits an advertiser from associating with a corresponding website.

4. The method of claim 1, wherein the never-in-view statistic comprises a fraction of advertisement impressions that was never in the viewable area of the browser window.

5. The method of claim 1, further comprising identifying at least one website as likely to be suspicious based on the viewability score by determining that the never-in-view statistic exceeds a selected threshold value, wherein the selected threshold value indicates that the at least one website is engaging in suspicious activity.

6. The method of claim 1, further comprising:
determining a portion of the plurality of pages corresponding to the website;
determining one or more advertisements presented on the portion of the plurality of pages; and
determining a plurality of browsers associated with advertisement calls for the one or more advertisements.

7. The method of claim 1, further comprising:
extracting identification data associated with at least one website that is deemed suspicious;
searching for other websites having identification data that is similar to the extracted identification data; and
determining whether at least one of the other websites should be deemed as likely to be suspicious.

8. The method of claim 1, further comprising:
receiving training data;
identifying features for differentiating suspicious websites from normal websites using the received training data; and
using a classifier with the identified features to identify the suspicious websites from the plurality of websites.

9. A system for detecting suspicious activity from a plurality of websites, the system comprising:
a server that includes a hardware processor that:
receives advertisement impression information associated with a plurality of pages;
determines, from the received advertisement impression information, a never-in-view statistic for each of the plurality of pages, wherein the never-in-view statistic indicates a likelihood of whether an advertisement displayed on a webpage was never within a viewable area in a browser window rendered by a browser application;
determines a viewability score for the advertisement impression based on the never-in-view statistic;
identifies the advertisement impression as likely to be suspicious based on the determined viewability score; and
transmits information relating to the advertisement identified as likely to be suspicious from being purchased for advertisement placement.

10. The system of claim 9, wherein the hardware processor further inhibits content associated with the advertisement impression identified as likely to be suspicious from being purchased for advertisement placement.

11. The system of claim 9, wherein the hardware processor further transmits information relating to the identified advertisement impression that inhibits an advertiser from associating with a corresponding website.

12. The system of claim 9, wherein the never-in-view statistic comprises a fraction of advertisement impressions that was never in the viewable area of the browser window.

13. The system of claim 9, wherein the hardware processor further identifies at least one website as likely to be suspicious based on the viewability score by determining that the never-in-view statistic exceeds a selected threshold value, wherein the selected threshold value indicates that the at least one website is engaging in suspicious activity.

14. The system of claim 9, wherein the hardware processor further:
determines a portion of the plurality of pages corresponding to the website;
determines one or more advertisements presented on the portion of the plurality of pages; and
determines a plurality of browsers associated with advertisement calls for the one or more advertisements.

15. The system of claim 9, wherein the hardware processor further:
extracts identification data associated with at least one website that is deemed suspicious;
searches for other websites having identification data that is similar to the extracted identification data; and
determines whether at least one of the other websites should be deemed as likely to be suspicious.

16. The system of claim 9, wherein the hardware processor further:
receives training data;
identifies features for differentiating suspicious websites from normal websites using the received training data; and
uses a classifier with the identified features to identify the suspicious websites from the plurality of websites.

17. A non-transitory computer-readable medium containing computer-executable instructions that, when executed by a processor, cause the processor to perform a method for detecting suspicious activity from a plurality of websites, the method comprising:
receiving advertisement impression information associated with a plurality of pages;
determining, from the received advertisement impression information, a never-in-view statistic for each of the plurality of pages, wherein the never-in-view statistic indicates a likelihood of whether an advertisement displayed on a webpage was never within a viewable area in a browser window rendered by a browser application;
determining a viewability score for the advertisement impression based on the never-in-view statistic;
identifying the advertisement impression as likely to be suspicious based on the determined viewability score; and
transmitting, by the server, information relating to the advertisement identified as likely to be suspicious from being purchased for advertisement placement.

* * * * *